Jan. 8, 1957 L. C. MULLEN 2,776,682
SHAPER ATTACHMENT INSERT FOR SAW TABLES
Filed July 11, 1955 2 Sheets-Sheet 1
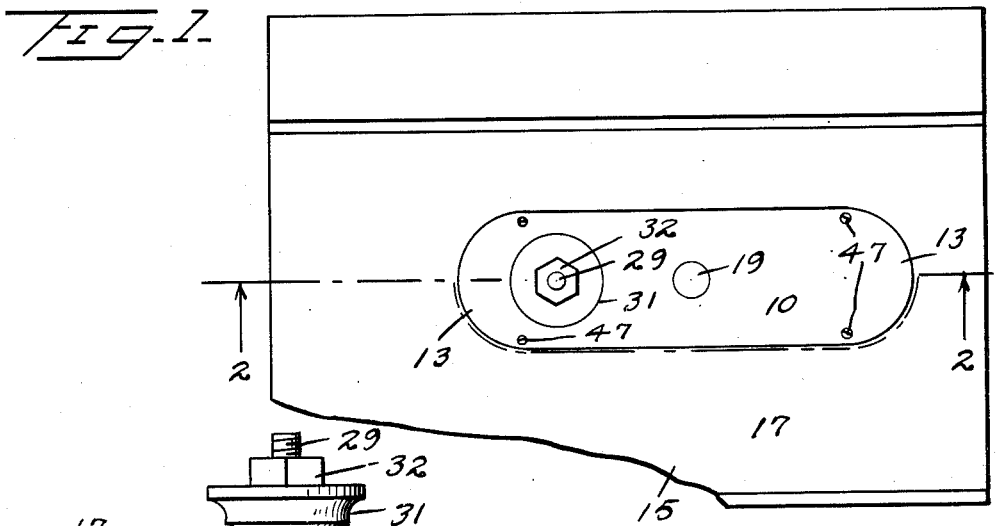
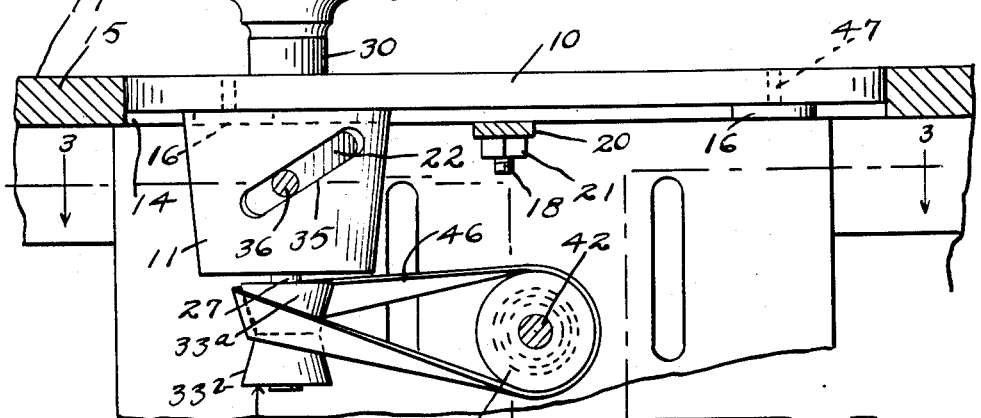
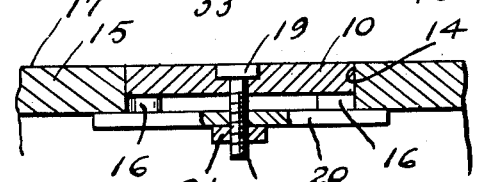
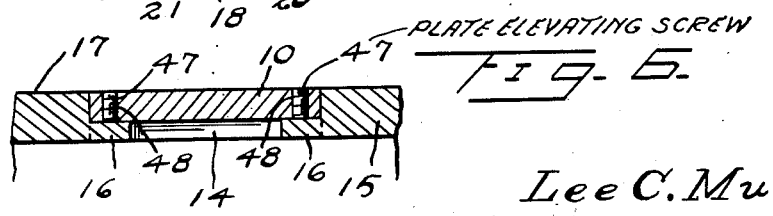
INVENTOR
Lee C. Mullen
BY John N. Randolph
ATTORNEY Jan. 8, 1957   L. C. MULLEN   2,776,682
SHAPER ATTACHMENT INSERT FOR SAW TABLES
Filed July 11, 1955   2 Sheets-Sheet 2
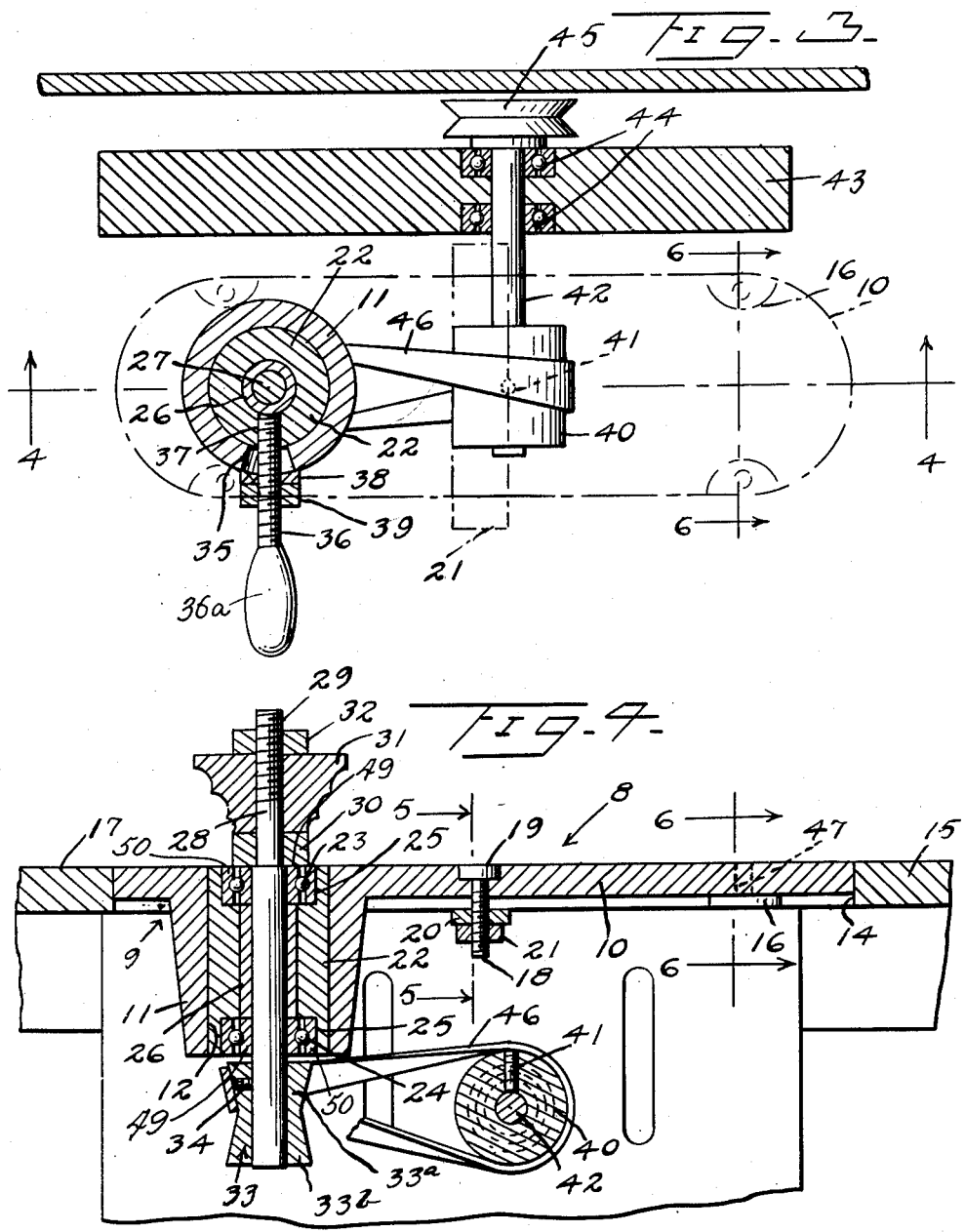
INVENTOR
*Lee C. Mullen*
BY *John N. Randolph*
ATTORNEY

United States Patent Office 2,776,682
Patented Jan. 8, 1957

2,776,682

SHAPER ATTACHMENT INSERT FOR SAW TABLES

Lee C. Mullen, Galesburg, Ill., assignor to Maxine C. Mullen, Galesburg, Ill.

Application July 11, 1955, Serial No. 520,968

4 Claims. (Cl. 144—134)

This invention relates to a universal shaper attachment for use with saw tables and has for its primary object to provide a shaper unit which may be quickly and easily applied to a conventional saw table by removal of the saw blade and slotted plate disposed thereabove and which will function efficiently with the saw table and the saw blade spindle to provide a shaper.

A further object of the invention is to provide a shaper attachment including a frame which is formed of a single casting.

Another object of the invention is to provide a shaper having novel means for adjusting a top surface of the shaper frame relative to a top surface of a saw table in which the frame is mounted and for vertically adjusting the cutter of the shaper relative to the upper surface of the shaper frame and saw table.

Various other objects and advantages of the invention will hereinafter become more fully apparent from the following description of the drawings, illustrating a presently preferred embodiment thereof, and wherein:

Figure 1 is a fragmentary top plan view of a part of a conventional saw table and showing the shaper attachment applied thereto;

Figure 2 is an enlarged fragmentary longitudinal vertical sectional view, taken substantially along a plane as indicated by the line 2—2 of Figure 1;

Figure 3 is a horizontal sectional view, taken substantially along a plane as indicated by the line 3—3 of Figure 2;

Figure 4 is a vertical longitudinal sectional view showing the shaper attachment in an operative position, taken substantially along a plane as indicated by the line 4—4 of Figure 3, and Figures 5 and 6 are cross sectional views, taken substantially along planes as indicated by the lines 5—5 and 6—6, respectively, of Figure 4.

Referring more specifically to the drawings, the shaper insert in its entirety and comprising the invention is designated generally 8 and includes a body portion or frame, designated generally 9, composed of a substantially flat elongated plate 10 and a boss 11. The boss 11 forms an integral part of the plate 10 and extends downwardly from said plate near one end thereof. The boss 11 is preferably tapered externally away from the plate and has a bore 12 of substantially uniform diameter extending longitudinally therethrough and through the plate 10.

The plate 10 is elongated and has rounded substantially semicircular ends 13. Said plate 10 is of a size to fit relatively snug in an elongated opening 14 of a conventional saw table 15, from which opening 14 the conventional slotted plate, not shown, has been removed. The table-top 15 is provided with lugs 16 which extend inwardly from each side of the opening 14, adjacent each end thereof, and which lugs are disposed substantially below the level of the upper surface 17 of the table-top 15. The four lugs 16 provide supports for supporting the plate 10 of the attachment in the opening 14.

A bolt 18 extends downwardly through the center of the plate 10 and has a head 19 countersunk therein. The bolt 18 extends loosely through the central portion of a hold-down bar 20 which is supported on the bolt by a nut 21 which threadedly engages the bolt below the bar 20. The bar 20 is of a length slightly greater than the width of the plate 10 and opening 14 and by loosening the nut 21 may be turned to a position beneath said plate for applying the plate to or for removing said plate from the opening 14. When the plate is applied to the opening 14, the bar 20 is turned to a position crosswise of said plate to engage under the table-top 15 beyond the sides of the opening 14, as seen in Figure 5, and the nut 21 is then tightened for retaining the plate 10 immovably in the table opening.

An outer bearing bushing or sleeve 22 is turnably and slidably disposed in the bore 12 and extends substantially from end-to-end thereof. The bushing 22 has antifriction bearings 23 and 24 which seat in recesses 25, formed in the upper and lower ends thereof. The bearings 23 and 24 each includes an inner race 49 and an outer race 50. The bore of the bushing 22 between the bearings 23 and 24 preferably contains a bushing or liner 26. A spindle 27 extends through and is rotatably disposed in the bearings 23 and 24 and said bushing 26. The spindle 27 has a stem 28 of reduced diameter constituting the upper end thereof and which extends from the upper surface of the upper antifriction bearing 23 and the plate 10 and which is provided with a threaded upper portion 29. A spacing collar 30 is disposed on the lower end of the stem 28 and rests upon the shouldered upper end of the enlarged spindle portion 27 from which the stem 28 projects, and on the upper bearing 23. A cutter 31 of a desired shape and configuration is disposed on the stem 28 above and in engagement with the collar 30 and is detachably secured to said stem for rotation with the spindle 27 by a nut 32 which engages the threaded portion 29 and between which and the collar 30 the cutter 31 is clamped.

The lower portion of the spindle 27 extends downwardly from the lower bearing 24 and the lower ends of the quill 22 and boss 11. A belt pulley 33 is mounted on and secured to the lower end of the spindle 27, as by means of a setscrew 34, as seen in Figure 4, so that the upper end of the pulley 33 is spaced from the parts 11, 21 and 24. The belt pulley 33 is composed of corresponding upper and lower frusto-conical end portions 33a and 33b, respectively, which taper toward one another.

As best seen in Figure 2, the boss 11 is provided with an inclined or helical slot 35. A bolt 36 extends inwardly through and is loosely disposed in said slot 35 and is threadedly secured at its inner end in a radially disposed threaded bore 37 of the quill 22, as best seen in Figure 3. The bolt 36 carries a washer 38 and a nut 39. The washer 38 is disposed between the nut 39 and the outer side of the boss 11 and is of a diameter greater than the width of the slot 35. A handle 36a is secured to and extends from the outer end of the bolt 36.

A belt pulley 40, which is preferably of uniform diameter from end-to-end thereof, is detachably secured as by means of a setscrew 41 to the end portion of a spindle 42 from which a saw blade, not shown, has been removed. The spindle 42 extends through an upright wall member 43 of the saw table, the upper end of which is suitably secured to the underside of the table-top 15 to one side of the opening 14. Said wall 43 is recessed to accommodate antifriction bearings 44 through which the spindle 42 extends and in which said spindle is journaled. The spindle 42 can be driven in any conventional manner from any suitable power source, not shown, as by a belt, not shown, trained over a pulley 45 which is fixed to the other end of said spindle 42. An endless belt 46 is trained around the pulleys 33 and 40 for driving the shaper spindle 27 from the spindle 42.

Adjusting screws 47, as best seen in Figure 6, extend threadedly through bores 48 formed in the plate 10 above the lugs 16. Said adjusting screws 47 may be individually adjusted downwardly for elevating the plate 10 or parts thereof relative to one or more of the lugs 16 for adjustably positioning the upper surface of the plate 10 relative to the upper surface of the table-top 15.

Additionally, the nut 39 can be displaced away from the washer 38 so that the handle 36a can be swung relative to the boss 11 and in so moving will be cammed upwardly or downwardly by the bottom or top surfaces, respectively, of the slot 35, for turning the bushing 22 and the parts carried thereby in the boss 11 for raising or lowering said bushing and parts relative to the frame 9 to thus vary the elevation of the cutter element 31 relative to the table-top surface 17 and the upper surface of the plate 10. Thereafter, the nut 39 is tightened for clamping the washer 38 against the boss 11 to maintain the bushing 22 in different elevated positions relative to the boss.

The saw spindle 42 is driven for driving the shaper spindle 27 to revolve the cutter element 31 which may be employed in a conventional manner with the upper table-top surface 17 and the upper surface of the plate 10 for shaping workpieces, not shown, which are supported on the parts 10 and 15 for engagement with the cutter 31. It will also be readily apparent that cutters of different sizes or shapes may be interchangeably utilized with the spindle 27 by merely removing and replacing the nut 32. The belt pulley 33 having the inwardly tapered end portions is provided so that the belt 46 can engage either end or portions of both ends of the pulley 33 depending upon the extent that said pulley is vertically adjusted with the spindle 27 relative to the pulley 40.

It will be readily apparent that it is only necessary to loosen the nut 21 and screw 41 to completely remove the shaper attachment 8 from the saw table. Thus, said attachment may be quickly applied to or removed from a conventional saw table and thus provides a unit of extremely simple construction which may be very economically manufactured and sold, yet which is capable of efficiently functioning with a conventional saw table. Additionally, the unit when not in use and removed from the saw table may be conveniently stored in a small space.

Various modifications and changes are contemplated and may obviously be resorted to, without departing from the spirit or scope of the invention as hereinafter defined by the appended claims.

I claim as my invention:

1. A shaper attachment for a saw table comprising a frame including a substantially flat plate adapted to fit detachably in an opening of a saw table top and to be supported on lugs which project into said opening, a boss depending from a part of said plate and formed integral therewith, said frame having a bore extending through the plate and longitudinally through the boss, an outer bushing turnably and slidably disposed in said bore, a shaper spindle extending through said outer bushing, bearing means journaling said spindle and mounted in the outer bushing, said spindle having an upper end projecting upwardly from said plate and bushing, a cutter mounted on said upper spindle end, means detachably securing said cutter to the spindle for rotation therewith, said last mentioned means supporting the spindle in the bushing, a belt pulley fixed to the lower end of said spindle and disposed below the boss and bushing, a second belt pulley adapted to be detachably fixed to a driving spindle of the saw table and disposed with the axis thereof crosswise to the axis of said first mentioned belt pulley and the shaper spindle, and an endless belt trained around said belt pulleys for driving the shaper spindle and cutter from the drive spindle.

2. A shaper attachment as in claim 1, said boss being provided with an inclined slot, a bolt secured in said bushing and extending outwardly through and loosely disposed in said slot, a handle connected to and movable with the bolt longitudinally of the slot for raising and lowering the bushing, spindle and parts carried thereby relative to the frame, and means supported by said bolt for securing the bushing in different elevated positions relative to the frame and with the bushing disposed either entirely within the bore or projecting from either end thereof.

3. A shaper attachment as in claim 2, and support members extending through said plate for engagement on said lugs and individually adjustable relative to the plate for adjustably positioning the upper surface of said plate relative to a top surface of the table-top.

4. A shaper attachment as in claim 3, and hold-down means adjustably carried by said plate including a bar swivelly supported beneath the plate for spanning the table-top opening and having end portions for engaging the underside of the table-top in one position thereof to retain the shaper attachment frame immovable in the table-top opening.

References Cited in the file of this patent
UNITED STATES PATENTS

| | | |
|---|---|---|
| 1,576,249 | Sherman | Mar. 9, 1926 |
| 2,020,222 | Tautz | Nov. 5, 1935 |
| 2,045,422 | Tautz | June 23, 1936 |
| 2,615,479 | Bearup | Oct. 28, 1952 |